(12) United States Patent
Klamra

(10) Patent No.: US 11,640,423 B2
(45) Date of Patent: *May 2, 2023

(54) SYSTEMS AND METHODS FOR SELECTING IMAGES FOR A MEDIA ITEM

(71) Applicant: Spotify AB, Stockholm (SE)

(72) Inventor: Mikael Simon David Klamra, Stockholm (SE)

(73) Assignee: Spotify AB, Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 17/677,779

(22) Filed: Feb. 22, 2022

(65) Prior Publication Data

US 2022/0269709 A1   Aug. 25, 2022

Related U.S. Application Data

(63) Continuation of application No. 16/825,074, filed on Mar. 20, 2020, now Pat. No. 11,281,710.

(51) Int. Cl.
*G06F 16/00* (2019.01)
*G06F 16/432* (2019.01)
(Continued)

(52) U.S. Cl.
CPC ........ *G06F 16/434* (2019.01); *G06F 16/4387* (2019.01); *G06F 16/535* (2019.01); *G06F 16/5846* (2019.01)

(58) Field of Classification Search
CPC .. G06F 16/434; G06F 16/4387; G06F 16/535; G06F 16/5846; G06F 16/438; G06F 16/538
See application file for complete search history.

(56) References Cited

U.S. PATENT DOCUMENTS 7,685,132 B2   3/2010   Hyman
8,583,671 B2   11/2013   Martin et al.
(Continued)

FOREIGN PATENT DOCUMENTS

EP        3340073 A1      6/2018
WO    WO2017015218 A1    1/2017

OTHER PUBLICATIONS

Klamra, Notice of Allowance, U.S. Appl. No. 16/825,074, dated Nov. 16, 2021, 8 pgs.
(Continued)

*Primary Examiner* — Jared M Bibbee
(74) *Attorney, Agent, or Firm* — Morgan, Lewis & Bockius LLP

(57) ABSTRACT

A server system obtains a collection of images, each image in the collection of images being associated with a first set of text descriptors. The server system obtains a media item being associated with a second set of text descriptors. The server system selects a subset of the collection of images, including: selecting an initial subset of the collection of images, wherein the initial subset of the collection of images consists of images that share a text descriptor with the media item; obtaining a set of preferences for a user of the media-providing service; and selecting the subset of the collection of images from the initial subset of the collection of images based on the set of preferences for the user of the media-providing service. The server system concurrently presents: a respective image of the subset of the collection of images; and the media item.

17 Claims, 7 Drawing Sheets

(51) Int. Cl.
*G06F 16/438* (2019.01)
*G06F 16/535* (2019.01)
*G06F 16/583* (2019.01)

(56) References Cited

U.S. PATENT DOCUMENTS

| | | | |
|---|---|---|---|
| 9,524,084 B2* | 12/2016 | Otto | G06F 16/4387 |
| 9,942,356 B1 | 4/2018 | Gibson et al. | |
| 10,013,492 B1 | 7/2018 | Petts et al. | |
| 10,055,413 B2 | 8/2018 | Jehan et al. | |
| 10,140,515 B1* | 11/2018 | Waldo | G06F 16/686 |
| 10,375,454 B1* | 8/2019 | Parker | H04N 21/84 |
| 2005/0015712 A1 | 1/2005 | Plastina et al. | |
| 2006/0167876 A1* | 7/2006 | Benitez | G06F 16/48 |
| | | | 715/201 |
| 2008/0301173 A1 | 12/2008 | Ryu et al. | |
| 2009/0055376 A1 | 2/2009 | Slaney et al. | |
| 2009/0070184 A1 | 3/2009 | Svendsen | |
| 2009/0076821 A1 | 3/2009 | Brenner et al. | |
| 2009/0132905 A1 | 5/2009 | Hoshino | |
| 2009/0304272 A1* | 12/2009 | Makadia | G06F 40/169 |
| | | | 382/218 |
| 2009/0327222 A1 | 12/2009 | Spitzer-Williams et al. | |
| 2010/0125351 A1 | 5/2010 | Davydov | |
| 2010/0161619 A1 | 6/2010 | Lamere et al. | |
| 2010/0223223 A1 | 9/2010 | Sandler et al. | |
| 2011/0099514 A1* | 4/2011 | Singhal | G06F 3/0482 |
| | | | 715/835 |
| 2013/0254065 A1 | 9/2013 | Harbick et al. | |
| 2014/0289241 A1 | 9/2014 | Anderson | |
| 2016/0063116 A1 | 3/2016 | Abuelsaad et al. | |
| 2016/0210345 A1 | 7/2016 | Spiegelman et al. | |
| 2017/0155964 A1* | 6/2017 | Oztaskent | H04N 21/41407 |
| 2017/0270562 A1* | 9/2017 | Ben-Rubi | G06F 16/435 |
| 2018/0189306 A1 | 7/2018 | Lamere et al. | |
| 2018/0262452 A1 | 9/2018 | Guthery et al. | |
| 2018/0365239 A1 | 12/2018 | Bharati et al. | |
| 2019/0042576 A1 | 2/2019 | Mpossi et al. | |
| 2019/0294690 A1 | 9/2019 | Pastor et al. | |
| 2021/0200805 A1* | 7/2021 | Wang | G06F 16/686 |

OTHER PUBLICATIONS

Levy et al., Improving Distributional Similarity with Lessons Learned from Word Embeddings, May 2015, Transactions of the Association for Computational Linguistics, vol. 3, pp. 211-225, 16 pgs.

Wang, Office Action, U.S. Appl. No. 16/732,176, dated Oct. 4, 2021, 15 pgs.

Wang, Office Action, U.S. Appl. No. 16/732,176, dated Apr. 12, 2022, 16 pgs.

Wang, Notice of Allowance, U.S. Appl. No. 16/732,176, dated Aug. 30, 2022, 7 pgs.

* cited by examiner

500

At an electronic device with one or more processors and memory, wherein the electronic device is associated with a media-providing service: 502

Obtain a collection of images, each image in the collection of images being associated with a first set of scores, including a respective first score associated with each respective text descriptor of a set of text descriptors 504

The first set of scores are assigned based on an analysis of the image with an image recognition system. 506

The first set of scores are assigned manually. 508

Obtain a media item being associated with a second set of scores, including a respective second score associated with each respective text descriptor of the set of text descriptors. 510

The second set of scores are assigned using an analysis of content of the media item. 512

The second set of scores are assigned using an analysis of text associated with the media item. 514

The second set of scores are assigned manually. 516

SYSTEMS AND METHODS FOR SELECTING IMAGES FOR A MEDIA ITEM

RELATED APPLICATION

This application is a continuation of U.S. application Ser. No. 16/825,074, filed Mar. 20, 2020, entitled, "Systems and Methods for Selecting Images for a Media Item," which is incorporated by reference in its entirety.

TECHNICAL FIELD

The disclosed embodiments relate generally to selecting appropriate images for displaying concurrently with media content items, and in particular, to analyzing text descriptors associated with images to provide one or more images that match media content items to enhance the user experience of media content item consumption.

BACKGROUND

Access to electronic media, such as music and video content, has expanded dramatically over time. As a departure from physical media, media content providers stream media to electronic devices across wireless networks, improving the convenience with which users can digest and experience such content.

As it becomes easier for users to find content, media content providers can organize media content items and group related content items together in order to provide users with better user experiences. Media content providers use a combination of information about the media content items and information about the users in order to provide personalized content for users.

SUMMARY

There is a need for systems and methods for providing users with images corresponding to particular media items (e.g., providing "fitting" images to accompany the media items). In some circumstances, these images can replace or complement existing images that are "hard-wired" to the media item (e.g., album cover art). To this end, some embodiments described herein compare text descriptors associated with an image to text associated with a media item. Images with a close fit are provided with the media item, enhancing the user's visual experience when consuming the media item.

More particularly, in some embodiments, the systems and methods described herein obtain a collection of images that are associated with text descriptors, each having a corresponding score indicating the strength of the association. Likewise, media items are scored according to the same text descriptors and matched with one or more images from the collection (e.g., using the respective scores). Matched images from the collection are presented to the user along with the media item.

To that end, in accordance with some embodiments, a method is performed at an electronic device. The electronic device has one or more processors and memory storing instructions for execution by the one or more processors. The method includes obtaining a collection of images. Each image in the collection of images is associated with a first set of scores including a respective first score associated with each respective text descriptor of a set of text descriptors. The method includes obtaining a media content item being associated with a second set of scores including a respective second score associated with each respective text descriptor of the set of text descriptors. The method further includes selecting a subset of the collection of images based on the first set of scores and the second set of scores. The method further includes concurrently presenting a respective image of the subset of the collection of images and the media item.

In accordance with some embodiments, an electronic device includes one or more processors and memory storing one or more programs configured to be executed by the one or more processors. The one or more programs include instructions for obtaining a collection of images. Each image in the collection of images is associated with a first set of scores including a respective first score associated with each respective text descriptor of a set of text descriptors. The one or more programs further include instructions for obtaining a media item being associated with a second set of scores. The second set of scores includes a respective second score associated with each respective text descriptor of the set of text descriptors. The one or more programs further include instructions for selecting a subset of the collection of images based on the first set of scores and the second set of scores. The one or more programs further include instructions for concurrently presenting a respective image of the subset of the collection of images and the media item.

In accordance with some embodiments, a computer-readable storage medium has stored therein instructions that, when executed by an electronic device, cause the electronic device to obtain a collection of images. Each image in the collection of images is associated with a first set of scores including a respective first score associated with each respective text descriptor of a set of text descriptors. The instructions further cause the device to obtain a media item being associated with a second set of scores including a respective second score associated with each respective text descriptor of the set of text descriptors. The instructions further cause the device to select a subset of the collection of images based on the first set of scores and the second set of scores. The instructions further cause the device to concurrently present a respective image of the subset of the collection of images and the media item.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

FIGS. 5A-5C are flow diagrams illustrating a method of selecting images for a media item, in accordance with some embodiments.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first set of scores could be termed a second set of scores, and, similarly, a second set of scores could be termed a first set of scores, without departing from the scope of the various described embodiments. The first set of scores and the second set of scores are both sets of scores, but they are not the same set of scores.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
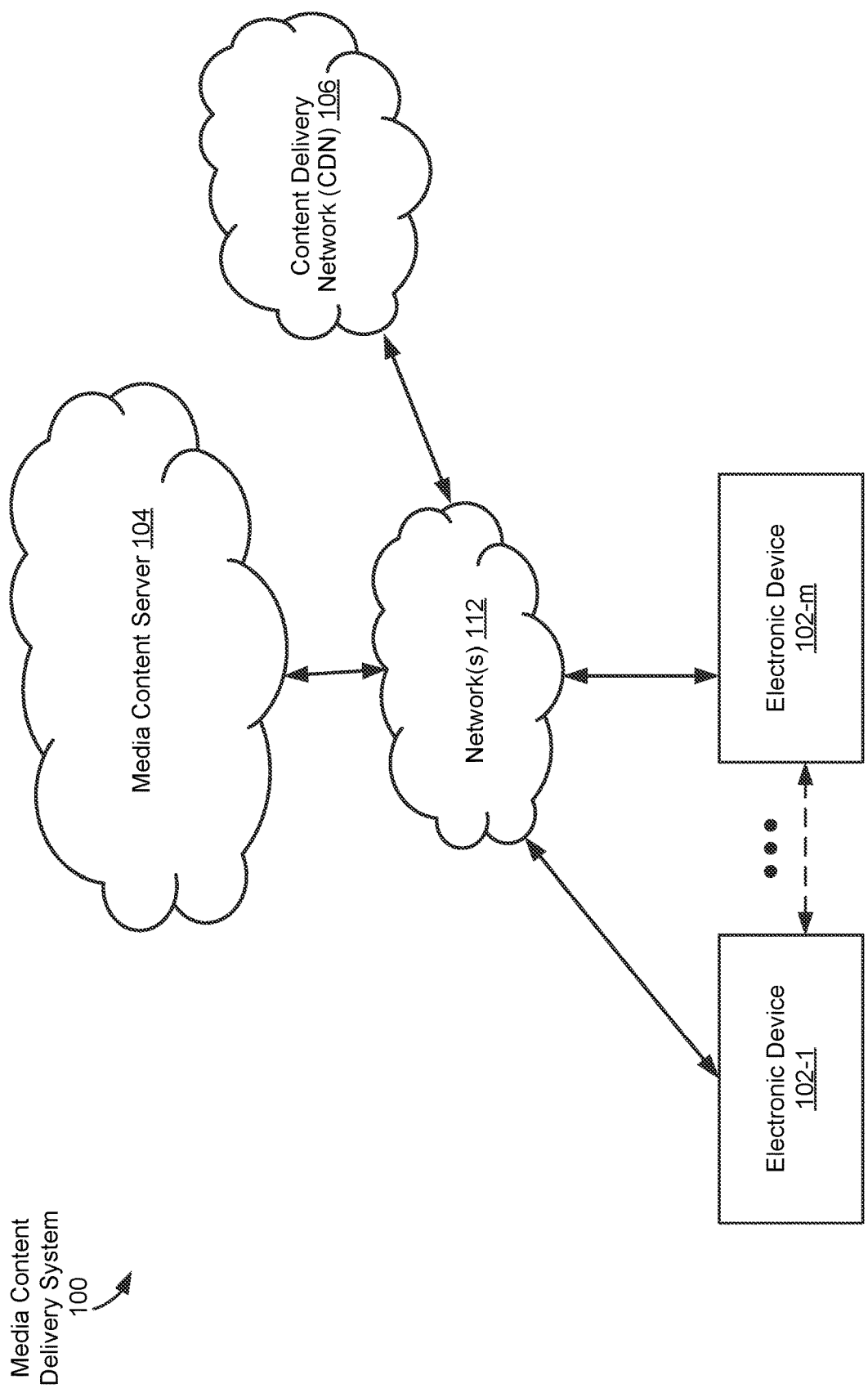
FIG. 1 is a block diagram illustrating a media content delivery system, in accordance with some embodiments.

FIG. 1 is a block diagram illustrating a media content delivery system 100, in accordance with some embodiments. The media content delivery system 100 includes one or more electronic devices 102 (e.g., electronic device 102-1 to electronic device 102-m, where m is an integer greater than one), one or more media content servers 104, and/or one or more content delivery networks (CDNs) 106. The one or more media content servers 104 are associated with (e.g., at least partially compose) a media-providing service. The one or more CDNs 106 store and/or provide one or more content items (e.g., to electronic devices 102). In some embodiments, the one or more CDNs 106 are associated with the media-providing service. In some embodiments, the CDNs 106 are included in the media content servers 104. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, digital media player, a speaker, television (TV), digital versatile disk (DVD) player, and/or any other electronic device capable of presenting media content (e.g., controlling playback of media items, such as music tracks, videos, etc.). Electronic devices 102 may connect to each other wirelessly and/or through a wired connection (e.g., directly through an interface, such as an HDMI interface). In some embodiments, an electronic device 102 is a headless client. In some embodiments, electronic devices 102-1 and 102-m are the same type of device (e.g., electronic device 102-1 and electronic device 102-m are both speakers). Alternatively, electronic device 102-1 and electronic device 102-m include two or more different types of devices.

In some embodiments, electronic devices 102-1 and 102-m send and receive media-control information through network(s) 112. For example, electronic devices 102-1 and 102-m send media control requests (e.g., requests to play music, movies, videos, or other media items, or playlists thereof) to media content server 104 through network(s) 112. Additionally, electronic devices 102-1 and 102-m, in some embodiments, also send indications of media content items to media content server 104 through network(s) 112. In some embodiments, the media content items are uploaded to electronic devices 102-1 and 102-m before the electronic devices forward the media content items to media content server 104.

In some embodiments, electronic device 102-1 communicates directly with electronic device 102-m (e.g., as illustrated by the dotted-line arrow), or any other electronic device 102. As illustrated in FIG. 1, electronic device 102-1 is able to communicate directly (e.g., through a wired connection and/or through a short-range wireless signal, such as those associated with personal-area-network communication technologies (e.g., BLUETOOTH/BLE), radio-frequency-based near-field communication technologies, infrared communication technologies, etc.) with electronic device 102-m. In some embodiments, electronic device 102-1 communicates with electronic device 102-m through network(s) 112. In some embodiments, electronic device 102-1 uses the direct connection with electronic device 102-m to stream content (e.g., data for media items) for playback on the electronic device 102-m.

In some embodiments, electronic device 102-1 and/or electronic device 102-m include a media application 222 (FIG. 2) that allows a respective user of the respective electronic device to upload (e.g., to media content server 104), browse, request (e.g., for playback at the electronic device 102), and/or present media content (e.g., control playback of music tracks, videos, etc.). In some embodiments, one or more media content items are stored locally by an electronic device 102 (e.g., in memory 212 of the electronic device 102, FIG. 2). In some embodiments, one or more media content items are received by an electronic device 102 in a data stream (e.g., from the CDN 106 and/or from the media content server 104). In some embodiments, the electronic device(s) 102 are capable of receiving media content (e.g., from the CDN 106) and presenting the received media content. For example, electronic device 102-1 may be a component of a network-connected audio/ video system (e.g., a home entertainment system, a radio/alarm clock with a digital display, and/or an infotainment system of a vehicle). In some embodiments, the CDN 106 sends media content to the electronic device(s) 102.

In some embodiments, the CDN 106 stores and provides media content (e.g., media content requested by the media application 222 of electronic device 102) to electronic device 102 via the network(s) 112. Content (also referred to herein as "media items," "media content items," and "content items") is received, stored, and/or served by the CDN 106. In some embodiments, content includes audio (e.g., music, spoken word, podcasts, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "tracks," and/or "audio tracks").

In some embodiments, media content server 104 receives media requests (e.g., commands) from electronic devices 102. In some embodiments, media content server 104 and/or CDN 106 stores one or more playlists (e.g., information indicating a set of media content items). For example, a playlist is a set of media content items defined by a user and/or defined by an editor associated with a media-providing service. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to CDN 106 and/or other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

Figure 2:
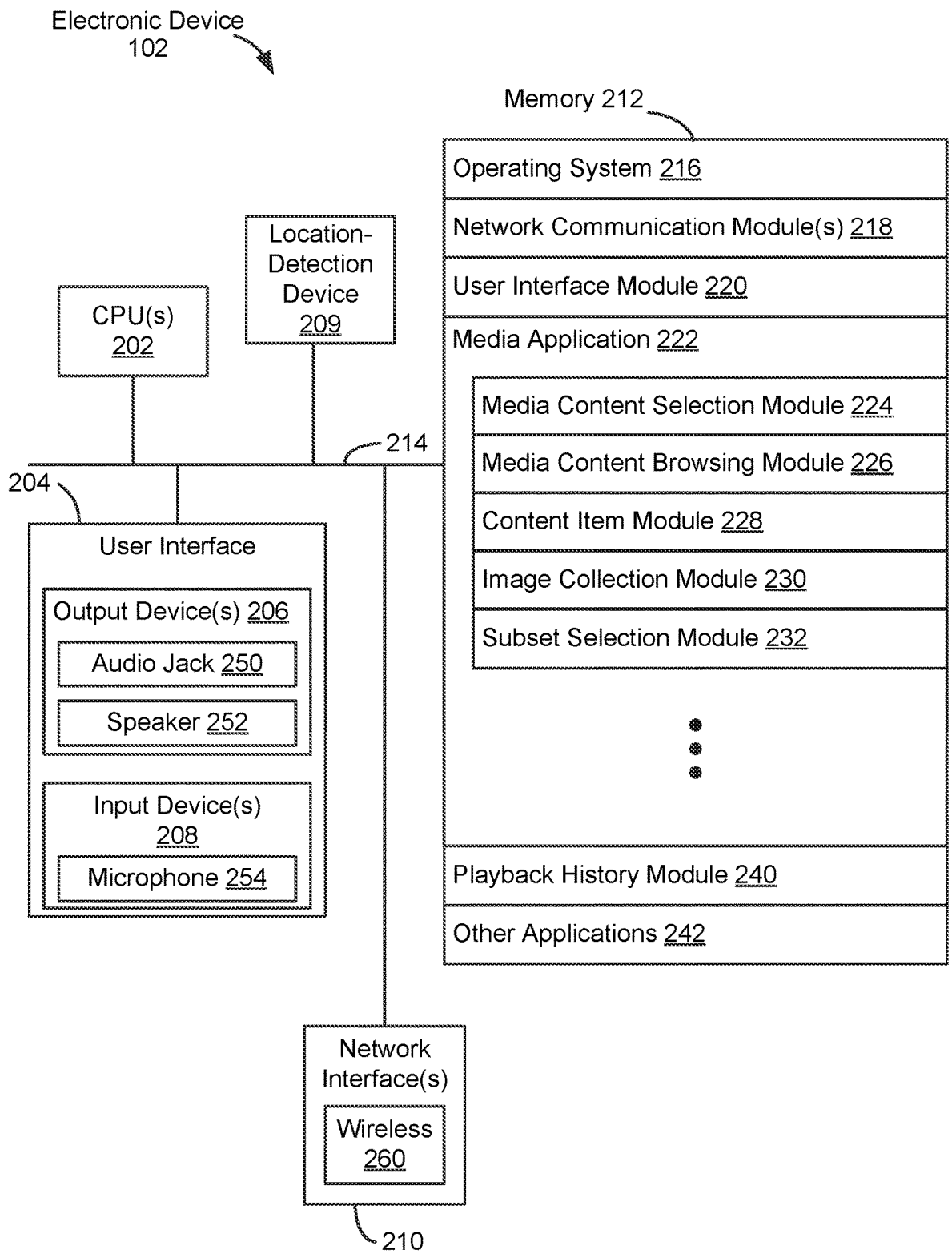
FIG. 2 is a block diagram illustrating a client device, in accordance with some embodiments.

FIG. 2 is a block diagram illustrating an electronic device 102 (e.g., electronic device 102-1 and/or electronic device 102-m, FIG. 1), in accordance with some embodiments. The electronic device 102 includes one or more central processing units (CPU(s), i.e., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include an audio jack 250 (or other physical output connection port) for connecting to speakers, earphones, headphones, or other external listening devices and/or speaker 252 (e.g., speakerphone device). Furthermore, some electronic devices 102 use a microphone and voice recognition device to supplement or replace the keyboard. Optionally, the electronic device 102 includes an audio input device (e.g., a microphone 254) to capture audio (e.g., speech from a user).

Optionally, the electronic device 102 includes a location-detection device 209, such as a global navigation satellite system (GNSS) (e.g., GPS (global positioning system), GLONASS, Galileo, BeiDou) or other geo-location receiver, and/or location-detection software for determining the location of the electronic device 102 (e.g., module for finding a position of the electronic device 102 using trilateration of measured signal strengths for nearby devices).

In some embodiments, the one or more network interfaces 210 include wireless and/or wired interfaces for receiving data from and/or transmitting data to other electronic devices 102, a media content server 104, a CDN 106, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, and/or or other wireless (e.g., Bluetooth-compatible) devices (e.g., for streaming audio data to the electronic device 102 of an automobile). Furthermore, in some embodiments, the wireless interface 260 (or a different communications interface of the one or more network interfaces 210) enables data communications with other WLAN-compatible devices (e.g., electronic device(s) 102) and/or the media content server 104 (via the one or more network(s) 112, FIG. 1).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

an operating system 216 that includes procedures for handling various basic system services and for performing hardware-dependent tasks;
 network communication module(s) 218 for connecting the electronic device 102 to other computing devices (e.g., other electronic device(s) 102, and/or media content server 104) via the one or more network interface(s) 210 (wired or wireless) connected to one or more network(s) 112;

a user interface module 220 that receives commands and/or inputs from a user via the user interface 204 (e.g., from the input devices 208) and provides outputs for playback and/or display on the user interface 204 (e.g., the output devices 206);

a media application 222 (e.g., an application for accessing a media-providing service of a media content provider associated with media content server 104) for uploading, browsing, receiving, processing, presenting, and/or requesting playback of media (e.g., media items). In some embodiments, media application 222 includes a media player, a streaming media application, and/or any other appropriate application or component of an application. In some embodiments, media application 222 is used to monitor, store, and/or transmit (e.g., to media content server 104) data associated with user behavior. In some embodiments, media application 222 also includes the following modules (or sets of instructions), or a subset or superset thereof:

a media content selection module 224 for selecting one or more media content items and/or sending, to the media content server, an indication of the selected media content item(s);

a media content browsing module 226 for providing controls and/or user interfaces enabling a user to navigate, select for playback, and otherwise control or interact with media content, whether the media content is stored or played locally or remotely;

a content items module 228 for storing media items for playback at the electronic device;

an image collection module 230 for collecting, storing and/or creating (e.g., curating) images corresponding to one or more media items (e.g., an image of a sunflower to correspond to a song about nature);

a subset selection module 232 for collecting, storing, and/or creating (e.g., curating) one or more subsets of images corresponding to one or more media items (e.g., images from image collection module 230 curated for a specific media item genre);

a playback history module 240 for storing (e.g., as a list for each user) media content items that have been presented (e.g., streamed) to a respective user and/or analyzing playback patterns for one or more users;

other applications 242, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
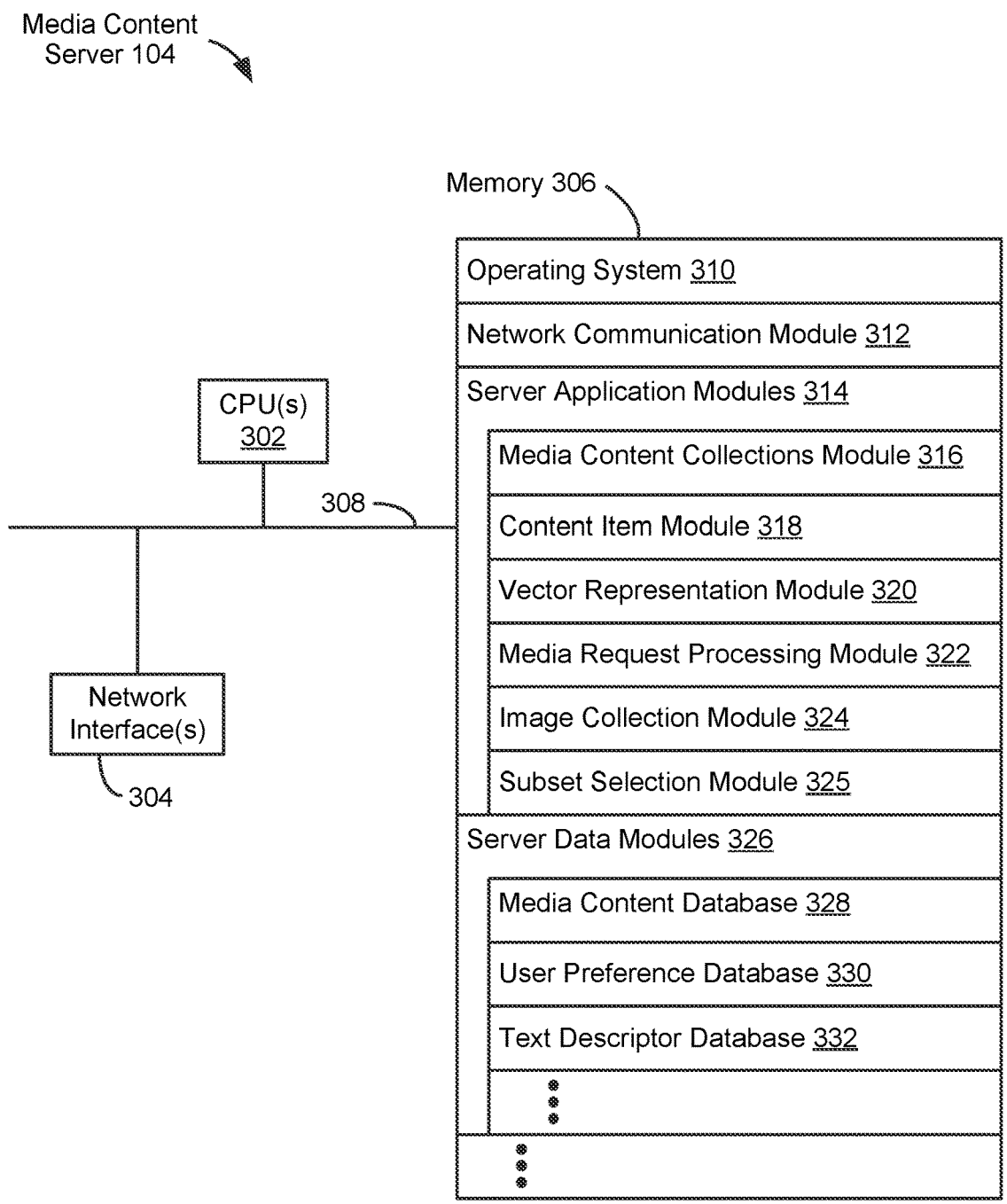
FIG. 3 is a block diagram illustrating a media content server, in accordance with some embodiments.

FIG. 3 is a block diagram illustrating a media content server 104, in accordance with some embodiments. The media content server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

an operating system 310 that includes procedures for handling various basic system services and for performing hardware-dependent tasks;

a network communication module 312 that is used for connecting the media content server 104 to other computing devices via one or more network interfaces 304 (wired or wireless) connected to one or more networks 112;

one or more server application modules 314 for performing various functions with respect to providing and managing a content service, the server application modules 314 including, but not limited to, one or more of:

a media content collections module 316 for storing and/or creating (e.g., curating) media content collections, each media content collection associated with one or more descriptor terms (e.g., playlist titles and/or descriptions) and/or including one or more media content items;

a content item collection module 318 for collecting and storing media items for playback;

a vector representation module 320 for determining and/or storing vector representations of content items in a vector space (e.g., song, podcast, video, see content item collections module 318);

a media request processing module 322 for processing requests for media content and facilitating access to requested media items by electronic devices (e.g., the electronic device 102) including, optionally, streaming media content to such devices;

an image collection module 324 for collecting, storing and/or creating (e.g., curating) images corresponding to one or more media items (e.g., an image of a sunflower to correspond to a song about nature);

a subset selection module 325 for collecting, storing, and/or creating (e.g., curating) one or more subsets of images corresponding to one or more media items (e.g., images from image collection module 324 curated for a specific media item genre);

one or more server data module(s) 326 for handling the storage of and/or access to media items and/or metadata relating to the media items; in some embodiments, the one or more server data module(s) 326 include:

a media content database 328 for storing media content items;

a user preference database 330 for storing (e.g., as a list for each user) user preferences (e.g., preference of podcasts, music genre, volume, speed, session duration); and a text descriptor database 332 for storing text descriptors corresponding to images (e.g., in image collection module 324), and/or text descriptors corresponding to media items (e.g., in media content database 328).

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above. In some embodiments, memory 212 stores one or more of the above identified modules described with regard to memory 306. In some embodiments, memory 306 stores one or more of the above identified modules described with regard to memory 212.

Although FIG. 3 illustrates the media content server 104 in accordance with some embodiments, FIG. 3 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 328 and/or user preference database 330 are stored on devices (e.g., CDN 106) that are accessed by media content server 104. The actual number of servers used to implement the media content server 104, and how features are allocated among them, will vary from one implementation to another and, optionally, depends in part on the amount of data traffic that the server system handles during peak usage periods as well as during average usage periods.

Figure 4B:
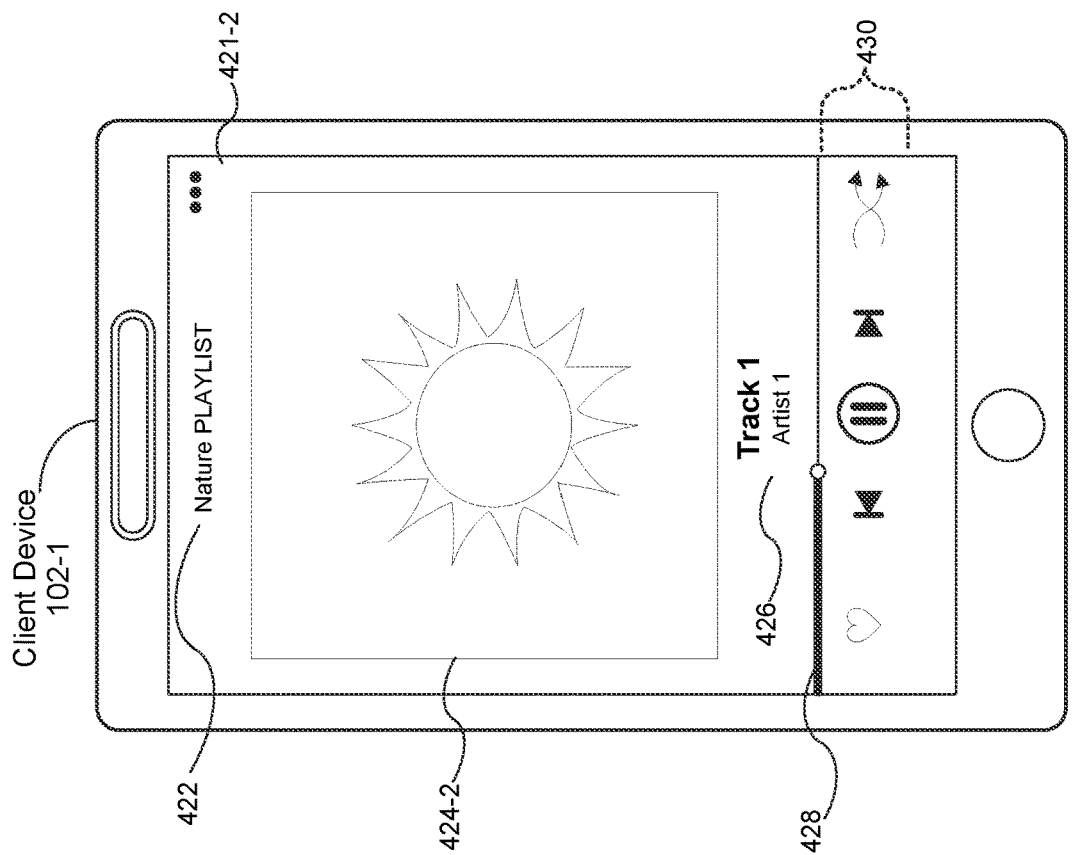
FIG. 4A-4B illustrate graphical user interfaces for client devices with images selected for a media item in accordance with some embodiments.
Figure 4A:
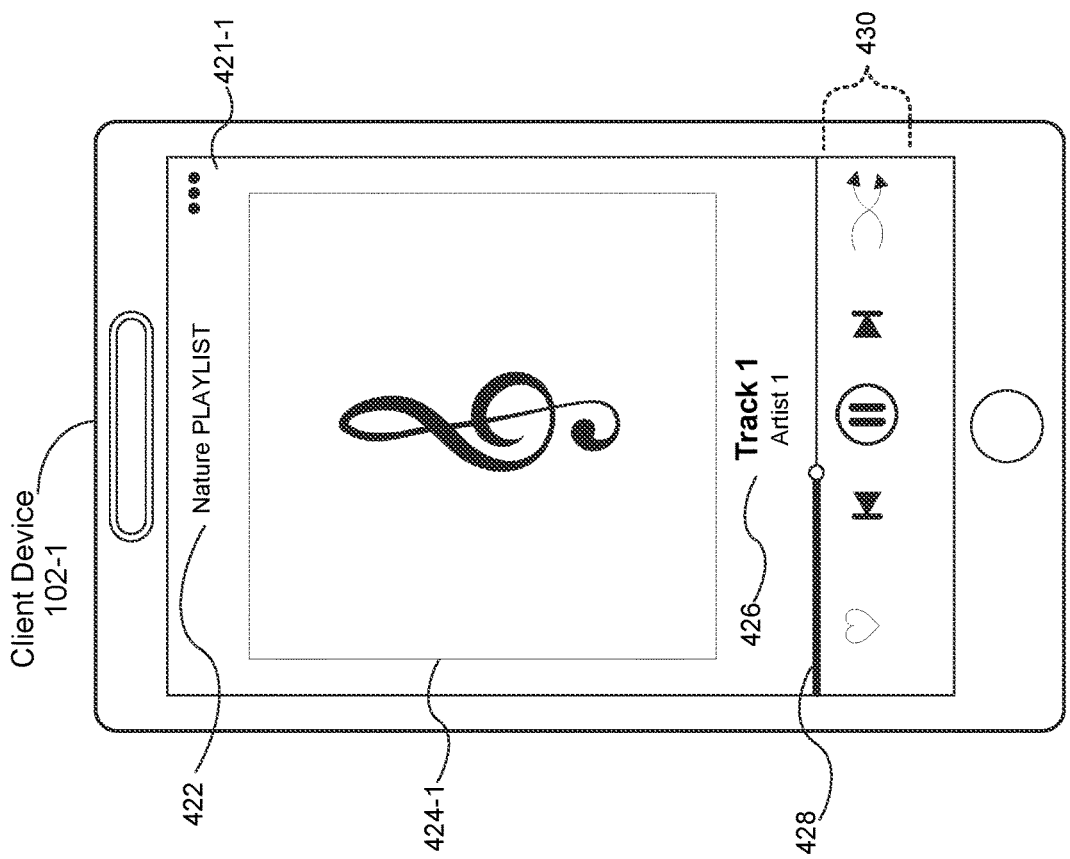

FIGS. 4A and 4B illustrate a first view of a graphical user interface (GUI) 421-1 and a second view of the graphical user interface 421-2 presented on client device 102-1. The first view of the graphical user interface displayed on client device 102-1 shows an image corresponding to currently presented media content, namely "Nature Playlist" 422. Note that as used herein, media content (or "currently presented media content" may consist of a single track (e.g., a song or a video) or may comprise a collection of tracks (e.g., an album or a playlist). In some embodiments, the media content does not have a corresponding image (e.g., artist artwork, album cover art, or other visual imagery associated with the media content). In some embodiments, the media content does have a corresponding image, and the methods described herein are used to supplement or replace an existing image corresponding to the track (e.g., complement or replace cover art).

For example, the currently presented media content shown on the GUI 421-1 does not include a cover art image. Instead, a filler image 424-1 (e.g., a default image that is not selected based on characteristics of the media content) of a treble clef is shown. Instead of showing a user a blank image or a filler image, the method and systems described herein replace the filler image of the treble clef with an image 424-2 corresponding to the media item (e.g., an image selected based on characteristics of the media content). In some embodiments, the selection is further based on preferences of the user. Based on the methods and systems described herein, one or more images are selected for display on the device to the user. In this case, an image of a sunflower is selected and concurrently presented with the media item.

Note that, as shown in FIGS. 4A-4B, in some embodiments, the images selected for the media content are displayed while the media content is being presented. Thus, in some embodiments, the graphical user interface 421-1 is a user interface for currently-presented media content. The graphical user interfaces 421-1 and 421-2 include, in addition the image, a title and/or artist information 426 (e.g., "Track 1," "Artist 1") of the media content item. The graphical user interfaces 421-1 and 421-2 further include a media scrubber control 428, including a play head that indicates a current playback position in a media item and that, when dragged across a timeline, changes the position in time. The graphical user interface 421 also includes one or more media playback controls 430 displayed by client device 102-1.

Figure 5B:
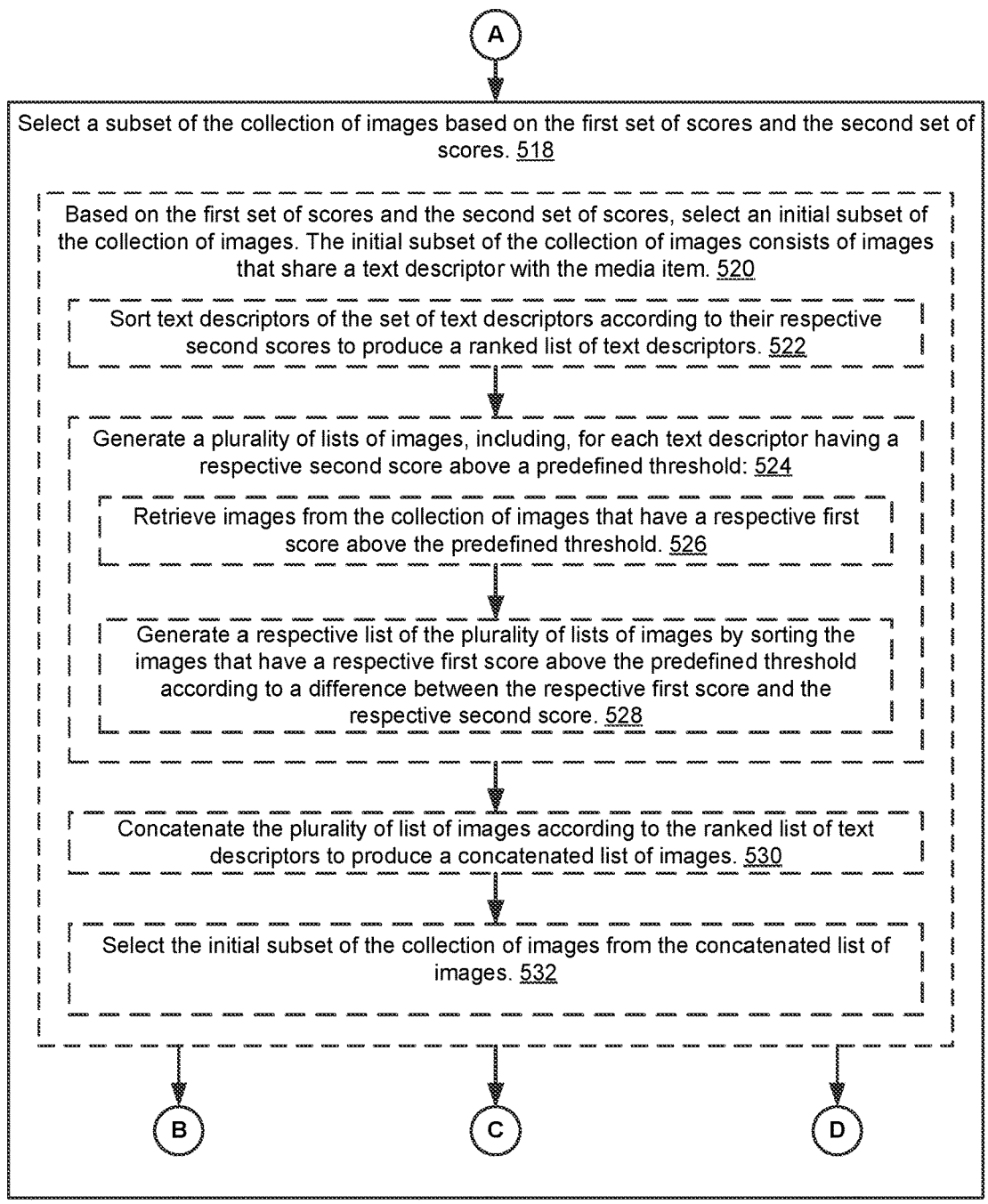
Figure 5C:
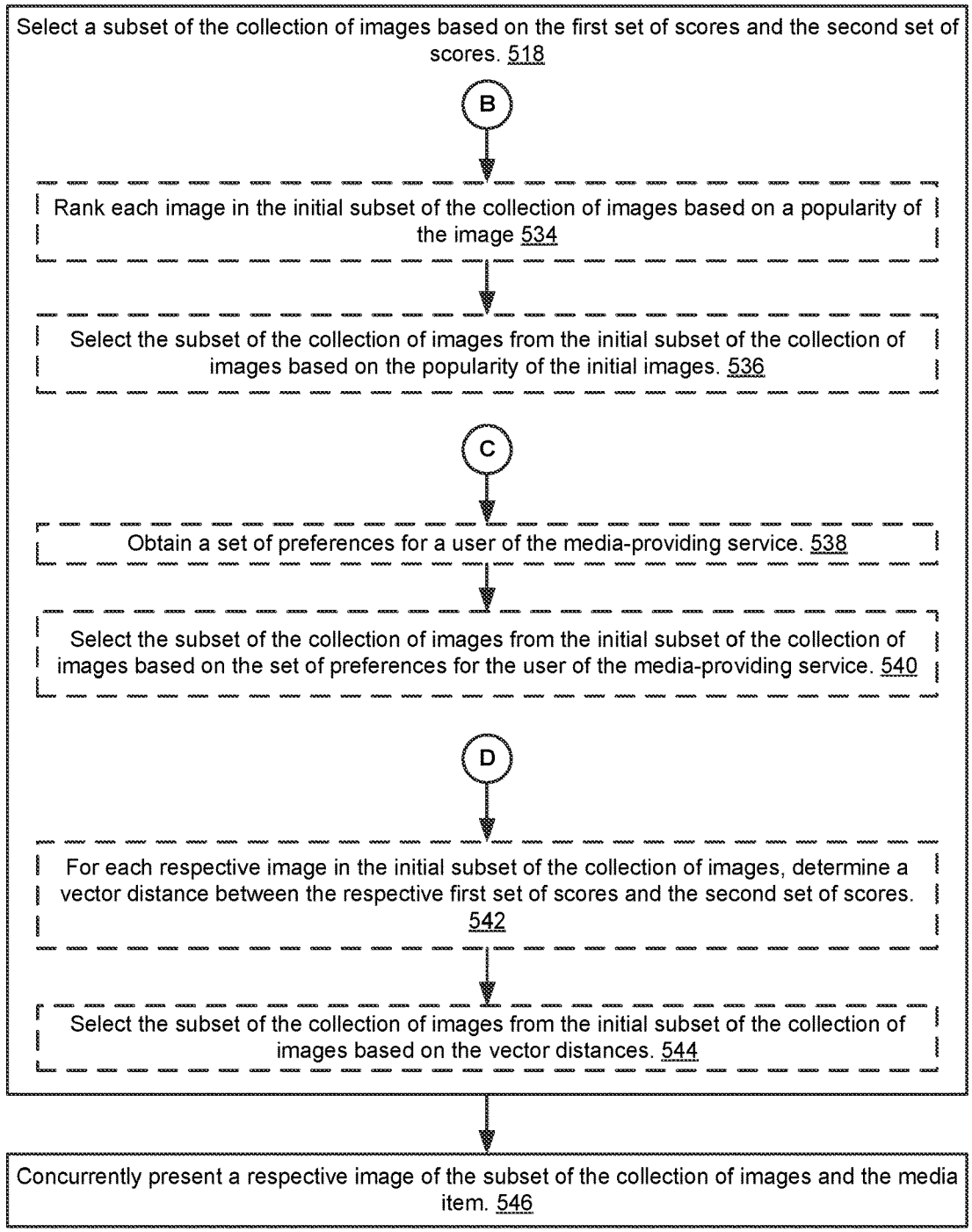

FIGS. 5A-5C are flow diagrams illustrating a method 500 of selecting images for a media item, in accordance with some embodiments. Method 500 may be performed (502) at an electronic device (e.g., media content server 104, client device 102), the electronic device has one or more processors and memory storing instructions for execution by the one or more processors. In some embodiments, the method 500 is performed by executing instructions stored in the memory (e.g., memory 212, FIG. 2 and/or memory 306, FIG. 3) of the electronic device. In some embodiments, the method 500 is performed by an electronic device 102-1 or a server system 104. In some embodiments, the method 500 is performed by a combination of the server system (e.g., including media content server 104 and/or CDN 106) and an electronic device (e.g., electronic device 102-1).

Referring now to FIG. 5A, in performing the method 500, an electronic device obtains (504) a collection of images (e.g., from image collection module 230, FIG. 2 and/or image collection module 324, FIG. 3), each image in the collection of images being associated with a first set of scores, including a respective first score associated with respective text descriptors (e.g., text labels) of a set of text descriptors (e.g., text descriptor database 332, FIG. 3) (e.g., each respective text descriptor of the set of text descriptors, or a respective first plurality of text descriptors of the set of text descriptors). In some embodiments, the set of text descriptors consists of possible descriptors for the images. In some embodiments, obtaining the collection of images comprises obtaining metadata for the collection of images that includes the text descriptors that apply to the media (and, optionally, their scores).

In some embodiments, text descriptors, with corresponding scores, are assigned to each image within a collection of images. In some embodiments, the first scores are assigned (506) based on an analysis of the image with an image recognition system (e.g., a machine learning classification system). For example, the first scores are assigned based on an analysis of the image using a custom image recognition system or using a third-party image recognition system (e.g., Microsoft Computer Vision and Google Cloud Vision). In some embodiments, the first set of scores are assigned (508) manually. In some embodiments, the electronic device assigns the first scores.

The text descriptors describe what the image depicts. In some embodiments, the score of each label is a floating point value between 0 and 1 reflecting the relevance of the label to the image (reflecting how strongly the text descriptor describes what the image depicts). For example, an image of a sun (e.g., FIG. 4B) may have four separate text descriptors: "summer"; "nature"; "day"; and "bright." Each text descriptor has a score based on the relevance of the text descriptor to the image. For example, "summer" is given a score of (0.4), "nature" is given a score of (0.8), "day" is given a score of (0.7), and "bright" is given a score of (0.3).

The electronic device obtains (510) a media item (e.g., from content items module 228) being associated with a second set of scores, including respective second scores associated with respective text descriptors of the set of text descriptors. For example, the media item is assigned a score associated with all or some of the text descriptors of the set of text descriptors (e.g., a respective second score of "0," or below some other threshold, associated with a possible descriptor indicates that the descriptor is not associated with or applicable to the media item). In some embodiments, obtaining the media item comprises obtaining metadata for the media that includes the text descriptors that apply to the media item (and, optionally, their scores). In some embodiments, the second set of scores are assigned (512) using an analysis of content of the media item. In some embodiments, the second set of scores are assigned (514) using an analysis of text associated with the media item (e.g., an analysis of lyrics, an analysis of users' comments about the media item, an analysis of play list titles of playlists that include the media item, an analysis of text describing the media item obtained from the Web, etc.). In some embodiments, the electronic device assigns the second set of scores. In some embodiments, the set of text descriptors (e.g., the set of possible text descriptors) and their format is the same for both the media item and the collection of images (e.g., the media item and the images are described using a common set of text descriptors). In some embodiments, the second set of scores are assigned (516) manually. Method 500 continues at FIG. 5B. The electronic device selects (518) a subset of the collection of images (e.g., subset selection module 323) based on the first set of scores and the second set of scores. In some embodiments, based on the first set of scores and the second set of scores, the electronic device selects (520) an initial subset of the collection of images. The initial subset of the collection of images consists of images that share a text descriptor with the media item.

In some embodiments, the electronic device sorts (522) text descriptors of the set of text descriptors according to their respective second scores to produce a ranked list of text descriptors. For example, a media item is associated with text descriptors "nature" having a score of (0.3); "relaxing" (0.8); and "mornings" (0.7). The descriptors are then sorted into the following order: 'relaxing", "mornings", and "nature". In some embodiments, the electronic device generates (524) a plurality of lists of images, including, for each text descriptor having a respective second score above a predefined threshold (e.g., above zero) performing operations 526-528.

In some embodiments, the electronic device retrieves (526) images from the collection of images that have a respective first score above the predefined threshold (e.g., above zero) and generates (528) a respective list of the plurality of lists of images by sorting the images that have a respective first score above the predefined threshold according to a difference between the respective first score and the respective second score (e.g., an absolute difference). Stated another way, for each text descriptor of the media item, the electronic device retrieves images that also include the same text descriptor and sorts the images in ascending order according to the absolute difference between the first and second scores.

In some embodiments, the electronic device concatenates (530) (e.g., merges) the plurality of list of images according to the ranked list of text descriptors to produce a concatenated (e.g., merged) list of images. For example, the plurality of lists of images is ranked in order so the concatenated list of images is ranked first according to the second score for the media item and, within that ranking, according to the absolute difference between the first and second scores. Further, from the example described above, the list of images for "relaxing" would precede the list of images for "morning," which would precede the list of images for "nature." In some embodiments, the electronic device selects (532) the initial subset of the collection of images from the concatenated list of images. For example, the electronic device selects. as the initial subset of images, a predefined number of images, in order, from the top of the list (e.g., 1000 images).

The method 500 continues at FIG. 5C. In some embodiments, the electronic device ranks (534) (e.g., re-ranks) each image in the initial subset of the collection of images based on a popularity of the images and selects (536) the subset of the collection of images (e.g., those images to present to the user) from the initial subset of the collection of images based on the popularity of the initial images.

Alternatively, in some embodiments, the electronic device obtains (538) a set of preferences for a user of the media-providing service and selects (540) the subset of the collection of images from the initial subset of the collection of images based on the set of preferences for the user of the media-providing service. For example, the electronic device ranks (e.g., re-ranks) the initial subset of the collection of images based on the set of preferences for the user of the media-providing service (e.g., user preference database 330) and the selection of the subset of the collection is based on the top results of the ranked subset. For example, when the user's preference includes a preference for cat images over non-cat images, images with cats are ranked higher than images without cats.

Alternatively, in some embodiments, for each respective image in the initial subset of the collection of images, the electronic device determines (542) a vector distance (e.g., using vector representation module 320) between the respective first set of scores and the second set of scores. The electronic device then selects (544) the subset of the collection of images from the initial subset of the collection of images based on the vector distances. For example, the initial subset of the collection of images is ranked in ascending or descending order based on the vector distance between the first and second sets of scores. The images are selected based on the ranking (e.g., by taking the ten highest ranked images and/or randomly shuffling between the ten highest ranked images). For example, a media item has two text descriptors "cat" with a score of 0.1 and "dog" with a score of 0.2. Images A and B are available from the collection of images. Image A has a text descriptor "cat" with a score of 0.9 and image B has a text descriptor "dog" with a score of 0.3. The rankings for the images are calculated based on the difference between the image text descriptor score and the media item text descriptor score. Thus, the distance for image A is 0.9−0.1=0.8. The distance for image B is 0.3−0.2=0.1. Since image B's vector distance is smaller than image A's, image B is ranked higher than image A. In some embodiments, when the image and the media item have two or more text descriptor in common, a Euclidean distance and/or Manhattan distance is used to calculate the rank.

In some embodiments, the electronic device concurrently presents (546) a respective image of the subset of the collection of images and the media item. In some embodiments, the electronic device presents the respective image of the subset of the collection for a specified time duration. After passage of the specified time duration, a subsequent image of the subset of the collection is shown for the specified time duration. For example, the subset of the collection includes 12 images. The first image is shown for 10 seconds and a second image is shown for 10 seconds thereafter. The images may be displayed in order until the media item finishes playing or the user selects a different media item In some embodiments, steps 502-546 are repeated to generate a next collection of images for a new version of a media item (e.g., a new episode of a podcast).

Although FIGS. 5A-5C illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method, comprising:
at an electronic device with one or more processors and memory, wherein the electronic device is associated with a media-providing service;
obtaining a collection of images, each image in the collection of images being associated with a first set of text descriptors;
obtaining a media item being associated with a second set of text descriptors;
selecting a subset of the collection of images, including:
selecting an initial subset of the collection of images, wherein the initial subset of the collection of images consists of images that share a text descriptor with the media item;
obtaining a set of preferences for a user of the media-providing service; and
selecting the subset of the collection of images from the initial subset of the collection of images based on the set of preferences for the user of the media-providing service; and
concurrently presenting:
a respective image of the subset of the collection of images; and
the media item.

2. The method of claim 1, wherein the first set of text descriptors is assigned based on an analysis of the image with an image recognition system.

3. The method of claim 1, wherein the first set of text descriptors is assigned manually.

4. The method of claim 1, wherein the second set of text descriptors is assigned using an analysis of content of the media item.

5. The method of claim 1, wherein the second set of text descriptors is assigned using an analysis of text associated with the media item.

6. The method of claim 1, wherein the second set of text descriptors is assigned manually.

7. The method of claim 1, further comprising:
assigning a first score to each respective text descriptor of the first set of text descriptors;
assigning a second score to each respective text descriptor of the second set of text descriptors; and
selecting the subset of the collection of images from the initial subset of the collection of images based on the first scores and the second scores.

8. The method of claim 1, wherein selecting the subset of the collection of images further includes:
ranking each image in the initial subset of the collection of images based on a popularity of the image; and
selecting the subset of the collection of images from the initial subset of the collection of images based on the popularity of the images in the initial subset of the collection of images.

9. An electronic device associated with a media-providing service comprising:
one or more processors; and
memory storing instructions for execution by the one or more processors, the instructions including instructions for:
obtaining a collection of images, each image in the collection of images being associated with a first set of text descriptors;
obtaining a media item being associated with a second set of text descriptors;
selecting a subset of the collection of images, including:
selecting an initial subset of the collection of images, wherein the initial subset of the collection of images consists of images that share a text descriptor with the media item;
obtaining a set of preferences for a user of the media-providing service; and
selecting the subset of the collection of images from the initial subset of the collection of images based on the set of preferences for the user of the media-providing service; and
concurrently presenting:
a respective image of the subset of the collection of images; and
the media item.

10. The electronic device of claim 9, wherein the first set of text descriptors is assigned based on an analysis of the image with an image recognition system.

11. The electronic device of claim 9, wherein the first set of text descriptors is assigned manually.

12. The electronic device of claim 9, wherein the second set of text descriptors is assigned using an analysis of content of the media item.

13. The electronic device of claim 9, wherein the second set of text descriptors is assigned using an analysis of text associated with the media item.

14. The electronic device of claim 9, wherein the second set of text descriptors is assigned manually.

15. The electronic device of claim 9, wherein the instructions further comprise instructions for:

assigning a first score to each respective text descriptor of the first set of text descriptors;

assigning a second score to each respective text descriptor of the second set of text descriptors; and selecting the subset of the collection of images from the initial subset of the collection of images based on the first scores and the second scores.

16. The electronic device of claim 9, wherein selecting the subset of the collection of images further includes:

ranking each image in the initial subset of the collection of images based on a popularity of the image; and selecting the subset of the collection of images from the initial subset of the collection of images based on the popularity of the images in the initial subset of the collection of images.

17. A non-transitory computer-readable storage medium storing instructions, which when executed by an electronic device associated with a media-providing service, cause the electronic device to:

obtain a collection of images, each image in the collection of images being associated with a first set of text descriptors;

obtain a media item being associated with a second set of text descriptors;

select a subset of the collection of images, including:
　selecting an initial subset of the collection of images, wherein the initial subset of the collection of images consists of images that share a text descriptor with the media item;
　obtaining a set of preferences for a user of the media-providing service; and
　selecting the subset of the collection of images from the initial subset of the collection of images based on the set of preferences for the user of the media-providing service; and concurrently present:
　a respective image of the subset of the collection of images; and
　the media item.

\* \* \* \* \*